United States Patent
Chun et al.

(10) Patent No.: US 8,681,712 B2
(45) Date of Patent: Mar. 25, 2014

(54) EFFICIENT AM RLC RE-ESTABLISHMENT MECHANISM

(75) Inventors: Sung-Duck Chun, Gyeonggi-Do (KR); Young-Dae Lee, Gyeonggi-Do (KR); Myung-Cheul Jung, Seoul (KR); Sung-Jun Park, Gyeonggi-Do (KR)

(73) Assignee: LG Electronics Inc., Seoul (KR)

( * ) Notice: Subject to any disclaimer, the term of this patent is extended or adjusted under 35 U.S.C. 154(b) by 972 days.

(21) Appl. No.: 12/307,239

(22) PCT Filed: Oct. 25, 2006

(86) PCT No.: PCT/KR2006/004378
§ 371 (c)(1),
(2), (4) Date: Dec. 31, 2008

(87) PCT Pub. No.: WO2008/004724
PCT Pub. Date: Jan. 10, 2008

(65) Prior Publication Data
US 2009/0290545 A1  Nov. 26, 2009

(30) Foreign Application Priority Data
Jul. 5, 2006 (KR) .................. 10-2006-0063133

(51) Int. Cl.
*H04J 3/00* (2006.01)
(52) U.S. Cl.
USPC ......................................... 370/329; 370/464
(58) Field of Classification Search
USPC ............................................................ 370/328
See application file for complete search history.

(56) References Cited

U.S. PATENT DOCUMENTS

| | | | |
|---|---|---|---|
| 7,450,547 B2 * | 11/2008 | Kim et al. | 370/331 |
| 2003/0147370 A1 | 8/2003 | Wu | |
| 2003/0206534 A1 | 11/2003 | Wu | |
| 2004/0032851 A1 | 2/2004 | Wu | |
| 2004/0203971 A1 | 10/2004 | Kuo | |
| 2004/0228491 A1 * | 11/2004 | Wu | 380/272 |
| 2005/0036477 A1 | 2/2005 | Jiang | |
| 2005/0054298 A1 * | 3/2005 | Chen | 455/67.11 |
| 2005/0287957 A1 * | 12/2005 | Lee et al. | 455/68 |
| 2007/0064600 A1 * | 3/2007 | Jiang | 370/229 |
| 2007/0064601 A1 * | 3/2007 | Jiang | 370/229 |
| 2008/0294958 A1 * | 11/2008 | Lee et al. | 714/748 |

FOREIGN PATENT DOCUMENTS

| | | |
|---|---|---|
| JP | 2002-27014 A | 1/2002 |
| KR | 10-2004-0070614 B1 | 8/2004 |
| TW | I220830 B | 9/2004 |

OTHER PUBLICATIONS

3GPP, TS 25.322, 3rd Generation Partnership Project; Technical Specification Group Radio Access Network; Radio Link Control (RLC) protocol specification (Release 5), Jun. 2004, v. 5.8.0.*

* cited by examiner

*Primary Examiner* — Gerald Smarth
(74) *Attorney, Agent, or Firm* — Birch, Stewart, Kolasch & Birch, LLP (57) ABSTRACT

A re-establishment method for an Acknowledged Mode Radio Link Control entity, the method comprising: receiving, from an upper entity, a command to perform Acknowledged Mode Radio Link Control re-establishment; and managing control protocol data units by considering the direction of the Acknowledged Mode Radio Link Control re-establishment, wherein control protocol data units related to the direction are deleted and control protocol data units not related to the direction are not deleted.

5 Claims, 3 Drawing Sheets

EFFICIENT AM RLC RE-ESTABLISHMENT MECHANISM

TECHNICAL FIELD

The present invention relates to an operation method of an AM RLC in a UMTS (Universal Mobile Telecommunications System), which is a European type IMT-2000 system. In particular, the present invention relates to an improved AM RLC re-establishment method, whereby when the RLC entity is re-established, the AM RLC reduces the (number of amount of) data or control messages to be deleted, to thus minimize discontinuous communications and can increase data transmission and reception rates.

BACKGROUND ART

Figure 1:
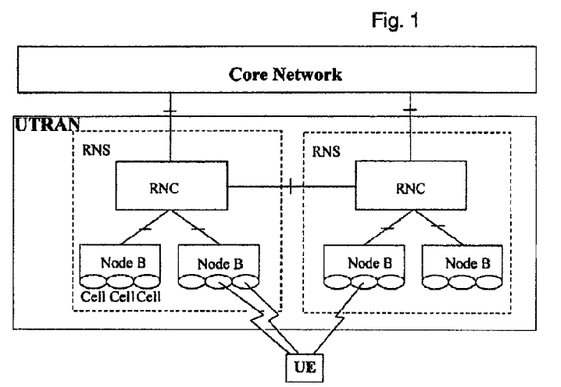
FIG. 1 shows an exemplary UMTS network architecture applicable to the related art and the present invention.

FIG. 1 shows an exemplary network architecture for UMTS (Universal Mobile Telecommunications System). The UMTS system is generally comprised of mobile terminals (user equipment: UE), a UTRAN (UMTS Terrestrial Radio Access Network), and a core network (CN). The UTRAN has one or more radio network sub-systems (RNS), with each RNS having a radio network controller (RNC) and one or more base stations (Node Bs). For each Node B, one or more cells exist.

Figure 2:
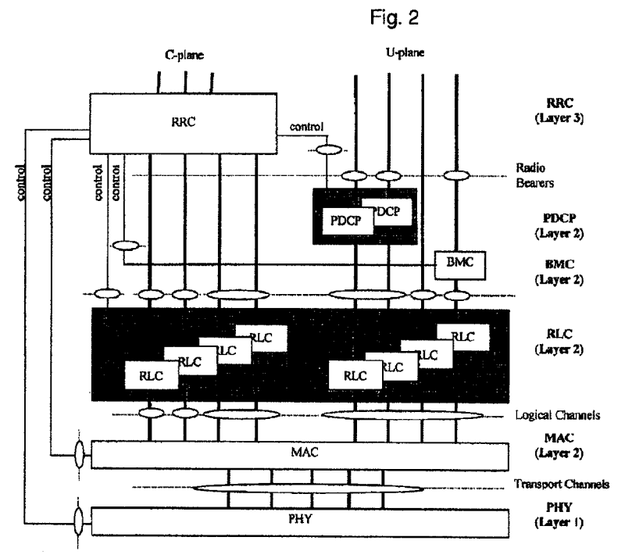
FIG. 2 shows an exemplary radio protocol architecture used in UMTS.

FIG. 2 shows an exemplary radio protocol architecture used in UMTS. These radio protocol layers exist in the UE and UTRAN in pairs, and handles data transmissions over the radio interface. With respect to each radio protocol layer, the PHY layer (Layer 1) serves the purpose of transmitting data over the radio interface by using various radio transmission techniques. The PHY layer is connected with a MAC layer (a higher level layer) via transport channels in order to support reliable data transmissions, and the transport channel can be divided into dedicated transport channels and common transport channels according to whether or not the channels are shared.

In Layer 2, the MAC, RLC, PDCP and BMC layers exist. The MAC layer performs mapping of various logical channels to various transport channels, and also performs logical channel multiplexing for mapping multiple logical channels to a single transport channel. The MAC layer is connected with the RLC layer (a higher level layer) via logical channels, and the logical channels are divided into control channels for transmitting control plane information and traffic channels for transmitting user plane information, according to the type of data being transmitted. The MAC layer can be further divided into a MAC-b sub-layer, a MAC-d sub-layer, a MACc/sh sub-layer, a MAC-hs sub-layer, and a MAC-e sub-layer according to the types of transport channels being managed. The MAC-b sub-layer handles the management of a BCH (Broadcast Channel), which is a transport channel for handling the broadcast of system information. The MAC-c/sh sub-layer manages common transport channels such as a FACH (Forward Access Channel), a DSCH (Downlink Shared Channel), and the like that are shared by various mobile terminals. The MAC-d sub-layer handles the management of a DCH (Dedicated Channel) that is a dedicated transport channel for a particular mobile terminal. The MAC-hs sub-layer manages a HS-DSCH (High Speed Downlink Shared Channel), which is a transport channel for high speed downlink data transmission. The MAC-e sub-layer manages a E-DCH (Enhanced Dedicated Channel), which is a transport channel for high speed uplink data transmission.

The RLC layer guarantees the quality of service (QoS) of each radio bearer (RB) and handles the transmission of data thereof. To guarantee the QoS that is unique to an RB, the RLC layer has one or two independent RLC entities for each RB, and provides three types of RLC modes, namely, TM (Transparent Mode), UM (Unacknowledged Mode), and AM (Acknowledged Mode) in order to support various QoS. Also, the RLC layer performs the function of adjusting the size of data to be appropriate for a lower level layer to transmit data over the radio interface. To do so, a function of segmentation and concatenation of data received from a higher level layer is performed.

The PDCP layer is located at a higher level from the RLC layer, and employs IP (Internet Protocol) packet formats (such as IPv4 or IPv6) to allow efficient data transmission over the radio interface having a relatively small bandwidth. To do so, the PDCP layer performs the function of header compression, which allows transmission of only necessary information in the header portion of the data, to thus increase the transmission efficiency of the radio interface. As header compression is the basic function, the PDCP layer only exists in the PS domain, and in order to provide effective header compression with respect to each PS service, one PDCP entity exists for each RB.

Additionally, in Layer 2, a BMC (Broadcast/Multicast Control) layer exists at a higher level from the RLC layer, and performs scheduling of cell broadcast messages and performs the function of broadcasting to mobile terminals located in a particular cell. The RRC (Radio Resource Control) layer located at the lowermost portion of Layer 3, is only defined in the control plane, controls the parameters of Layer 1 and Layer 2 that are related to the setup, reconfiguration, and release of RBs, and also handles the control of logical channels, transport channels, and physical channels. Here, the RB refers to a logical path that is provided by Layer 1 and Layer 2 of the radio protocol for data transfer between the mobile terminal and the UTRAN. In general, the setup of an RB refers to the process of stipulating the characteristics of a protocol layer and a channel required for providing a specific service, and setting the respective detailed parameters and operation methods.

The RLC layer that is related to the present invention will be considered in more detail.

A basic function of the RLC layer is to guarantee the QoS of each RB and to transmit data thereof. As the RB service is a service that the Layer 2 of the radio protocol provides to a higher level, the entire Layer 2 effects the QoS, and in particular, the effect of the RLC layer is significant. To guarantee the QoS that is unique to the RB, the RLC layer has independent RLC entities for each RB, and provides three types of RLC modes (TM, UM, AM) for supporting various QoS. These three modes of the RLC layer have differences in their operation methods because the QoS that they respectively support are different, and their detailed functions also have differences. As such, the RLC layer should be considered in more detail with respect to their operation modes.

The TM RLC is a mode in which no overhead is attached to the RLC SDU received from a higher level when forming (constituting) a RLC PDU. Namely, the name TM RLC refers to the fact that the RLC passes the SDUs in a transparent manner, and the following functions are performed in the user plane and the control plane. In the user plane, because the data processing time is short, transmission of real-time circuit data, such as voice or streaming of the circuit service (CS) domain, are handled. In the control plane, because there is no overhead within the RLC, in case of the uplink, transmission of RRC messages from unspecified mobile terminals are handled, while for the downlink, transmission of RRC messages that are broadcast to all mobile terminals within a cell are handled.

Unlike the transparent mode (TM), the mode in which overhead is added by the RLC is called a non-transparent mode, which comprises two types of modes; unacknowledged mode (UM) that provides no response that acknowledges receipt of transmitted data (UM), and acknowledged mode (AM) that provides a response. The UM RLC transmits each PDU upon adding thereto a PDU header that includes a sequence number (SN), to thus allow the receiving side to know which PDUs were lost (or missing) during transmission. Due to such function, the UM RLC handles the transmission of broadcast/multicast data in the user plane or the transmission of real-time packet data, such as voice (e.g., VoIP) or streaming of the packet service (PS) domain, and in the control plane, the transmission of RRC messages that do not need a reception acknowledgement response among the RRC messages transmitted to a particular terminal or particular terminal group.

As a type of non-transparent mode, the AM RLC forms a PDU by adding a PDU header that includes a SN (as done in the UM RLC), but unlike the UM RLC and the significant difference therefrom is that the receiving side provides an acknowledgement for a PDU transmitted from the transmitting side. In AM RLC, the reason why the receiving side provides acknowledgement is to request the transmitting side to re-transmit those PDUs that could not be received. Such re-transmission function is one of the most significant characteristics of the AM RLC. As a result, the purpose of the AM RLC is to guarantee error-free data transmissions through the re-transmitting function. Due to this purpose, the AM RLC, in the user plane, usually handles non-real-time packet data transmissions (such as TCP/IP of the PS domain), and in the control plane, handles the transmission of RRC messages that always requires reception acknowledgement response among the RRC messages transmitted to a particular terminal within a cell.

With respect to directions, the TM RLC and UM RLC are used in uni-directional communications, while AM RLC is used in bi-directional communications because there is feedback from the receiving side. As bi-directional communications are generally used for point-to-point communications, the AM RLC uses only a dedicated logical channel. There are also differences in structure, whereby for TM RLC and UM RLC, a single RLC entity has one type of structure for either a transmitter or receiver, but for AM RLC, a single RLC entity has both a transmitter and a receiver.

The AM RLC is complicated because of its re-transmission function. For managing re-transmission functions, the AM RLC has a re-transmission buffer in addition to a transmission/reception buffer, employs a transmission/reception window for flow control, performs a polling function whereby the transmitter requests status information from the peer RLC of the receiver, employs a status report sent by a receiver to report its buffer state to a peer RLC of the transmitter, employs a status PDU to carry the status information, performs a piggyback function that inserts a status PDU into a data PDU in order to increase data transmission efficiency, and also performs many other functions. In addition, if the AM RLC entity discovers a significant error during its operation process, a Reset PDU is employed to request the peer AM RLC entity to re-set all operations and parameters, and a Reset Ack PDU is used for responding to such Reset PDU. Also, to support such functions, the AM RLC requires various protocol parameters, state variables, timer, and the like. The PDUs used for data transmission control in the AM RLC, such as a status report or status PDU, Reset PDU, etc. are called Control PDUs, while the PDUs used for transferring user data are called Data PDUs.

To summarize, the PDUs used in AM RLC are divided into two types; Data PDUs and Control PDUs. There are four types of Control PDUs, namely, a Status PDU, a Piggybacked Status PDU, a Reset PDU, and a Reset Ack PDU.

A Reset Procedure is one situation where a Control PDU is employed. The Reset Procedure is used to solve problems when there is an erroneous situation in the operation of the AM RLC, such as when the sequence numbers being respectively used are different, when a certain number of transmission failures for a PDU or SDU occur, and the like. Upon using the Reset Procedure, the AM RLC of the receiver and of the transmitter initialize the state variables such that a state where communication can be performed again is achieved. The Reset Procedure is as follows. First, the side that determined to start the Reset Procedure, namely the AM RLC of the transmitter includes the transmission direction HFN (Hyper Frame Number) that it currently uses into the Reset PDU and transmits such to the receiver. Then, upon receiving such Reset PDU, the AM RLC of the receiver resets its reception direction HFN value and also initializes the sequence numbers and other various state variables. Also, the receiver AM RLC transmits a Reset Ack PDU that includes its transmission direction HFN value to the transmitter AM RLC, and upon receiving this Reset Ack PDU, the transmitter AM RLC initializes various state variables after resetting its reception direction HFN value.

Figure 3:
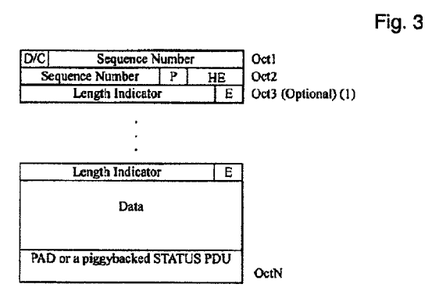
FIG. 3 shows an exemplary structure of an AM RLC PDU that is a data PDU used when data is transmitted.

FIG. 3 shows an exemplary structure of an RLC PDU used in an AM RLC entity. Here, the structure of an AMD PDU, which is a Data PDU used when transmitting data.

The AMD PDU is used when the AM RLC entity is to transmit user data or to transmit piggybacked status information and a polling bit. The user data portion comprises 8 bit integer multiples, and the AMD PDU header comprises a sequence number having a size of 2 octets. Also, the header portion of the AMD PDU includes a length indicator.

Figure 4:
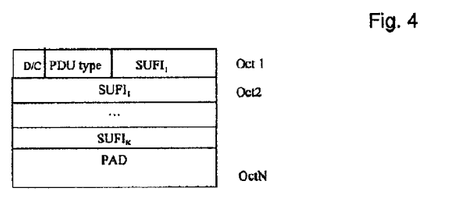
FIG. 4 shows an exemplary structure of a Status PDU.

FIG. 4 shows an exemplary structure of a Status PDU. The Status PDU is comprised of different types of super fields (SUFI). The Status PDU may have a variable size, but is limited to the size of the largest RLC PDU of the logical channel on which the Status PDU is transmitted. Here, the SUFI serves the purpose of providing certain information, such as indicating which AMD PDUs arrived at the receiver or which AMD PDUs have not arrived. The SUFI may be comprised of three parts; type, length and value.

Figure 5:
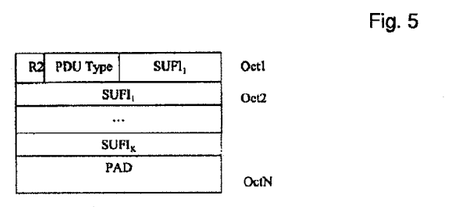
FIG. 5 shows an exemplary structure of a Piggyback Status PDU.

FIG. 5 shows an exemplary structure of a Piggybacked Status PDU. The structure of the Piggybacked Status PDU is similar to that of the AMD PDU, but the D/C field of the AMD PDU is replaced with a reserved bit (R2). The Piggybacked Status PDU is inserted if there is sufficient space remaining in the AMD PDU. The PDU type value is always fixed to be 000. Ultimately, a Control PDU includes both a Status PDU and a Piggybacked Status PDU.

Figure 6:
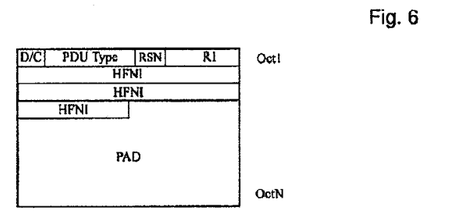
FIG. 6 shows an exemplary structure of a Reset/Reset Ack PDU.

FIG. 6 shows an exemplary structure of a Reset/Reset Ack PDU. The Reset PDU includes a 1 bit sequence number called an RSN. The Reset Ack PDU is transmitted in response to the received Reset PDU, and the RSN of the received Reset PDU is included when transmitting.

The following parameters are used in the Reset/Reset Ack PDU format.

(1) D/C field: indicates whether the PDU is a Control PDU or Data PDU (2) PDU Type: indicates the type of Control PDU, namely, whether the PDU is a Reset PDU, Status PDU, etc.

(3) Sequence Number: refers to sequence number information of the AMD PDU.

(4) Polling Bit: set when requesting a Status Report from the receiver.

(5) Extension bit (E): indicates whether or not the next octet is a length indicator.

(6) Reserved bit (R1): if used in a Reset PDU or a Reset Ack PDU, coded as 000.

(7) Header extension (HE): indicates whether the next octet is a length indicator or data.

(8) Length indicator: indicates the location of a boundary, if such boundary exists between respectively different SDUs within the data portion of a PDU.

(9) PAD: indicates a padding region, but not used in the AMD PDU.

The Reset procedure for the AM RLC entity will be explained below.

First, when a situation where a Reset procedure needs to be performed occurs, the receiver must send a Reset PDU to the transmitter. The Reset procedures is performed if a Status PDU containing an erroneous sequence number is received or if a particular PDU transmission has failed a certain number of times. When a Reset PDU is transmitted, the transmitter performs the following operations.

1. Transmission of the AMD PDU and Status PDU is stopped.

2. The received AMD RLC PDU, the Status PDU, and the Piggybacked Status PDU are ignored.

3. The VR(RST) is incremented by 1.

4. If VR(RST) is greater than MaxRST, this is informed to the RRC, if VR(RST) is less than MaxRST, the Reset PDU is transmitted to the receiver.

Here, the VR(RST) is initialized by using internal parameters of the receiver each time the reset procedure is performed. This value is the maximum value of transmitting the Reset PDU for each reset procedure. Namely, if the Reset PDU transmission exceeds the MaxRST value, the reset procedure is immediately terminated and the higher level is informed that an unsolvable error has occurred.

When the transmitter transmits the Reset PDU, a HFNI value and a RSN value are included in the transmission. Here, the transmitter sets the HFNI as the maximum HFN value that it uses. The HFN is a values used in encoding (encryption) and the transmitter uses the HFN value to encode the portions of the AMD PDU excluding the SN value of thereof. The receiver uses the same HFN value to decode the received AMD PDU. If the receiver and the transmitter do not have the same HFN value, communication therebetween cannot be maintained. Accordingly, in the reset procedure, the transmitter and receiver exchange their HFN values such that both the transmitter and receiver are set to have the same HFN value. Thus, the transmitter and the receiver include their HFN value in the Reset PDU or the Reset Ack PDU when transmitting.

The RSN value is used for matching each of the Reset PDUs and the Reset Ack PDUs. Namely, if the transmitter sent a Reset PDU with the RSN value set to 1, the receiver recognizes only the Reset Ack PDU having the RSN set to 1 as its desired Reset Ack PDU. If a Reset Ack PDU with a RSN value set to a value other than 1 is received, such Reset Ack PDU is deems as erroneous and is thus discarded. Also, for each reset procedure that begins, the RSN value is increased by one.

When the Reset Ack PDU is transmitted in response to the Reset PDU, the receiver sends the largest value HFN that is used in its transmission direction by filling it into the HFNI, and also, the same RSN value as that included in the corresponding Reset PDU is included in the Reset Ack PDU and transmitted.

Upon receiving the Reset PDU, the receiver performs the following operations.

1. The transmitter compares whether the RSN value used in the reset procedure that was last performed with the RSN value included in the currently received Reset PDU are the same or not. Then, step 2 is performed.

2. If the RSN values are the same in step 1, the receiver again transmits a Reset Ack PDU using the same value as that for previously transmitting the Reset Ack PDU. Then, step 3 is performed.

3. If the currently received Reset PDU is the first Reset PDU received after the RLC entity was established or re-established, or if the RSN values is different than that of the most recently received Reset PDU, then the following steps are sequentially performed; otherwise the process is terminated.

4. A Reset Ack PDU is newly formed and transmitted.

5. The state variables are initialized and the currently operating Timer is stopped.

6. The received RLC PDUs are discarded.

7. The RLC PDUs transmitted before the Reset are discarded.

8. The HFN of the receiver direction is set according to that in the received Reset PDU.

9. The HFN of the transmitter direction and of the receiver direction are increased by 1.

After the transmitter transmits the Reset PDU, a Reset Ack PDU is waited to be received, and when the Reset Ack PDU is received, the following operations are performed by the transmitter.

1. If the RSN value included in the Reset Ack PDU is the same as the RSN value included in the Reset PDU that it transmitted, the following steps are performed; otherwise, the Reset Ack PDU is discarded.

2. The HFN of the receiver direction is reset by using the HFNI value included in the received Reset Ack PDU.

3. The state variables are initialized and the currently operating Timer is stopped.

4. The received RLC PDUs are discarded.

5. The RLC PDUs transmitted before the Reset are discarded.

6. The HFN of the transmitter direction and of the receiver direction are increased by 1.

After performing such reset procedure, the transmitter and receiver both have the same HFN, and the encoding and decoding procedures are performed with this HFN.

Hereafter, the re-establishment procedure in the AM RLC entity related to the present invention will be described.

The RLC re-establishment procedure is performed upon instructions from the RRC entity. For the AM RLC entity, re-establishment may be performed for both directions (i.e., the transmitter direction and receiver direction), or only for one direction among the transmitter direction or the receiver direction. The following operations are performed according to commands of the RRC.

1. The state variables are initialized and values that can be set are then set.

2. The HFN value of the receiver direction is set according to the value instructed from a higher level.

3. The Control PDU(s) of the transmitter and receiver are deleted, and the AMD PDU(s) of the receiver are deleted.

Re-establishment in the transmitter direction of the RLC entity is performed in the following manner.

1. The state variables are initialized and values that can be set are then set.

2. The HFN value of the receiver direction is set according to the value instructed from a higher level.

3. For re-establishment only in the transmitter direction, perform procedure from step 4. For re-establishment of both the transmitter and the receiver, perform procedure from step 6.

4. The Control PDU(s) of both transmitter and receiver are all deleted, and among the SDUs in the transmitter, those SDUs that have been completely transmitted are deleted.

5. The SDU(s) not deleted in step 4 are re-segmented again according to the set RLC size. Then, step 7 is performed.

6. The Control PDU(s) of both the receiver and transmitter are deleted, and the AMD PDUs in the transmitter are deleted.

7. The timers, excluding Timer_poll_periodic and Timer_status_periodic, are stopped.

In the related art, when the RLC re-establishment procedure is performed, all Control PDU(s) are deleted even if the re-establishment is for a single direction (i.e. either the transmitting direction or the receiving direction). However, this may not be desirable in certain situations.

DISCLOSURE OF INVENTION

Technical Problem

In the related art, when the RLC re-establishment procedure is performed, all Control PDU(s) are deleted even if the re-establishment is for a single direction (i.e. either the transmitting direction or the receiving direction). However, this may not be desirable in certain situations.

Technical Solution

The present invention has been developed in order to solve at least the above described problems of the related art that deletes all control PDUs for both directions of re-establishment. As a result, the present invention provides an efficient AM RLC re-establishment mechanism (scheme) that deletes only those control PDUs related to a particular re-establishment direction.

MODE FOR THE INVENTION

One aspect of the present invention is the recognition by the present inventors regarding the problems and drawbacks of the related art described above and explained in more detail hereafter. Based upon such recognition, the features of the present invention have been developed.

The concepts and features of the present invention may be generally described as follows:

First, it should be noted that there may be many reasons why RLC re-establishment must be performed. One example would be when a mobile terminal (UE) is initially under the control of a first radio network control (RNC) but later falls under the control of a second RNC. As different manufacturers produce their own radio network controllers (RNCs), each RNC would use its own types of parameters, leading to compatibility problems.

Another example where RLC re-establishment (for an RLC of the UE, an RLC of the network, or both) would be needed is when a cell (or coverage area) contains different regions that can support different access techniques. For instance, with respect to a single cell, at locations near the center of the cell, the UE may be able to perform high speed access (such as HSDPA and/or HSUPA) with the network, but at locations near the boundary (or edge) of the cell, such high speed access may not be available. As the UE moves within a single cell, moves between two or more cells, moves between different types of networks, etc., RLC re-establishment should be performed in order to support seamless communications.

In the related art, when re-establishment (i.e., AM RLC re-establishment) is performed, the control information related to both the transmitting side and the receiving side are deleted. Namely, there is no distinction in handling control information based on the direction of re-establishment.

In contrast, according to the present invention, the control information is managed depending upon the direction in which re-establishment is performed. Namely, when a single-sided re-establishment is performed, the control information (e.g., control PDUs) related to that direction is not deleted, which is different than the related art wherein all control information is deleted regardless of the re-establishment direction.

The above general concepts and features will be described in more detail with respect to various embodiments of the present invention.

When the related art RLC re-establishment procedure is performed, all Control PDU(s) are deleted even if the re-establishment is for a single direction (i.e. either the transmitting direction or the receiving direction). In most cases, such does not significantly affect the data transmission capabilities of the mobile terminal or of the network. This is because, in most instances, when re-establishment is performed for both the receiving direction and the transmitting direction, the context of the RLC can only change because the Node B has changed or because the RNC has changed, and thus it is faster to newly start processing by disregarding all control message information. Also, doing so removes the possibility of inconsistencies (i.e., non-correspondence) in the context of the transmitter and of the receiver.

The related art re-establishment method may be sufficient for certain situations. However, as HSDPA (High Speed Downlink Packet Access) and HSUPA (High Speed Uplink Packet Access) techniques are being introduced, situations for RLC re-establishment frequently occur. An example would be when a mobile terminal, located (camped) within one cell, is initially located at a center of the cell but moves to the boundary (or edge) of the cell.

Namely, when the mobile terminal is at a central region of the cell, AM RLC PDU(s) having a relatively large size may be used, but when located at a cell boundary, the quality of the radio environment is degraded, and thus, relatively large sized AM RLC PDU(s) cannot be used. Accordingly, when the mobile terminal moves from a center of the cell to a cell boundary, or vice versa, despite the fact that the mobile terminal remains within the same cell, there is a need to change the size of the AM RLC PDU(s) used by the mobile terminal. The introduction of HSDPA and HSUPA has allowed various types of physical channels and transport channels to be used, and AM RLC PDU(s) having an optimal size for each physical channel or each transport channel can be used. As the size of the AM RLC PDU(s) changes, the RLC entity must be re-established.

However, in such case, the uplink and the downlink do not always change together. This is due to the fact that the downlink quality and the uplink quality may be different (i.e., distinct). Namely, the degree of degradation on the downlink does not result in the same degree of degradation on the uplink. Thus, when a mobile terminal that uses both HSDPA and HSUPA moves from the center of the cell to its boundary or edge, situations where the downlink quality is degraded to a level where HSDPA cannot be used, but where HSUPA may still be used occur quite frequently. As such, situations where the HSUPA quality is degraded yet the HSDPA quality remains satisfactory, or when the mobile terminal moves from a cell boundary to the cell center, as well as many other situations may occur. In such cases, re-establishment for both the transmitter direction and the receiver direction are not necessary, and only re-establishment for the corresponding direction (e.g., only for the uplink or only for the downlink) would be needed.

However, in the related art, even in those situation where re-establishment for one direction is necessary, all control PDU(s) for the transmitter direction and for the receiver direction are deleted. This results in serious problems in data transmission efficiency as shown in the following example.

Figure 7:
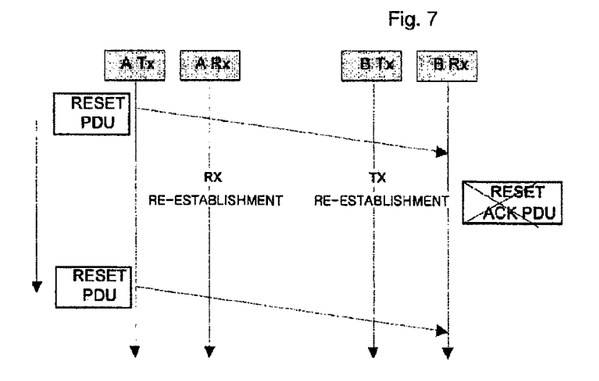
FIG. 7 shows an inefficient a single-sided (one direction) re-establishment procedure that occurs during a RLC Reset process.

FIG. 7 shows a re-establishment method while the Reset procedure is in progress.

1. The Reset procedure begins from the transmission direction of side A. A Reset PDU is transmitted, and a Reset PDU is received in the reception direction of side B.

2. The receiver direction of side B forms the Reset Ack PDU with respect to the Reset PDU and waits for transmission.

3. Simultaneously with the procedure of step 2, the re-establishment procedure with respect to one direction is performed. At side B, the re-establishment procedure for the transmitter direction occurs, and accordingly, at side A, the re-establishment procedure for the receiver direction occurs.

4. According to the related art, even if only the re-establishment procedure for the transmitter direction occurs at side B in step 3, all Control PDUs must be deleted. Thus, the Reset Ack PDU(s) formed during step 2 but not yet transmitted must be deleted. Here, the Reset Ack PDU is a PDU formed at the receiver of side B, and does not affect the transmitter of side B.

5. Side A waits for a response to the Reset PDU that was sent in step 1, but at side B, because the Reset Ack PDU was already deleted, side A cannot receive a response from side B. Thus, side A transmits a Reset PDU upon lapse of a certain time or when a new condition is satisfied.

In the above procedure, the Reset procedure must be handled quickly. Through the Reset procedure, each side exchanges HFNI values and the like and works towards normalizing communications. For example, if the HFN values used respectively for the directions of the receiver of side B and the transmitter of side A are different, data cannot be properly decoded at the receiver. Thus, the Reset procedure should be terminated as quickly as possible. However, the Reset procedure can be terminated only if a Reset Ack PDU is properly received by the transmitter. In the above process, even though re-establishment occurred in the direction that is unrelated to the Reset, because both the transmitter and the receiver deleted all Control PDUs, the procedure for normally exchanging Control PDUs is delayed.

This results in preventing data transmission and reception while the Reset procedure is being performed, and the data transmission rate is not only degraded, but also, correction of important state variables such as HFNI is prevented, which leads to problems of disrupted communications.

Accordingly, the present invention provides an improved operation of an AM RLC entity for a single-sided RLC re-establishment, which increases data transmission rate and minimizes communication disruptions.

In the present invention, during the single-sided RLC re-establishment procedure, the transmitting side and the receiving side only deletes the Control PDU(s) related to its respective direction.

Namely, when the receiving side of the AM RLC entity is re-established, the RLC entity only deletes those Control PDU(s) related to the receiving direction, while the Control PDU(s) related to the transmitting direction are not deleted.

Similarly, when the transmitting side of the AM RLC entity is re-established, the RLC entity only deletes those Control PDU(s) related to the transmitting direction, while the Control PDU(s) related to the receiving direction are not deleted.

Here, the Control PDU(s) related to the transmitting side direction refers to Control PDU(s) formed by the transmitting side of the RLC entity.

The Control PDU(s) formed by the transmitting side include Control PDU(s), such as a Reset PDU or a MRW SUFI, that are to be actively sent by the transmitting side.

The Control PDU(s) formed by the receiving side include Control PDU(s), such as a Reset Ack PDU or a MRW Ack SUFI, that are to be actively sent by the receiving side.

In the above procedure, the Control PDU(s) not deleted are to be transmitted to the peer entity immediately. The main reason why a Control PDU remains in the RLC entity is because the Control PDU is waiting in the buffer because the lower layer currently does not have the appropriate transmission capability. As an easy example, assuming that a certain RLC entity can transmit a PDU at every second, every 4 seconds, every 7 seconds, etc., a Control PDU generated at 2 seconds must wait 2 more seconds in order to be transmitted when 4 seconds is reached. However, during such wait time, a re-establishment procedure may occur. In such case, in order to quickly terminate the procedures in process, it would be effective to immediately send the Control PDU (that is waiting to be transmitted) as soon as the re-establishment occurs. Thus, among the Control PDU(s) that have not been transmitted, and not deleted by the re-establishment procedure should be immediately transmitted to the peer RLC entity. Accordingly, such Control PDU(s) that remain without being deleted should be reserved for transmission.

Thus the present invention proposes that with respect to Control PDUs formed before a re-establishment procedure and reserved for transmission, or Control PDUs not transmitted before the re-establishment procedure and not deleted through the re-establishment procedure, new Control PDU(s) should be formed and its transmission should be scheduled again.

In other words, when a re-establishment procedure for the transmitting side occurs, the receiving side of the RLC entity does not delete all Control PDUs existing at that time, but only deletes those Control PDUs related to the receiving side (direction).

Put differently, the present invention proposes that when re-establishment occurs, the receiving side of the RLC entity does not delete all existing Control PDUs, but Control PDUs unrelated to the receiving side (direction) are not deleted. Also, other Control PDUs are all deleted.

Put differently, the present invention proposes that when re-establishment occurs, the receiving side of the RLC entity does not delete all existing Control PDUs, but Control PDUs related to the transmitting side (direction) are not deleted. Also, the Control PDUs unrelated to the transmitting side (direction) are all deleted.

Here, Control PDUs related to the receiving side (direction) may include Acknowledgement Status Report, Window SUFI, MRW Ack SUFI, and the like.

Control PDUs unrelated to the receiving side (direction) may include MRW SUFI, Reset PDU, Reset Ack PDU, and the like.

Control PDUs related to the transmitting side (direction) may include MRW SUFI and the like.

Control PDUs unrelated to the transmitting side (direction) may include Acknowledgement Status Report, Window SUFI, MRW Ack SUFI, Reset PDU, Reset Ack PDU, and the like.

Next, an example of an RLC entity operation in the RLC re-establishment procedure according to the present invention will be described.

Figure 8:
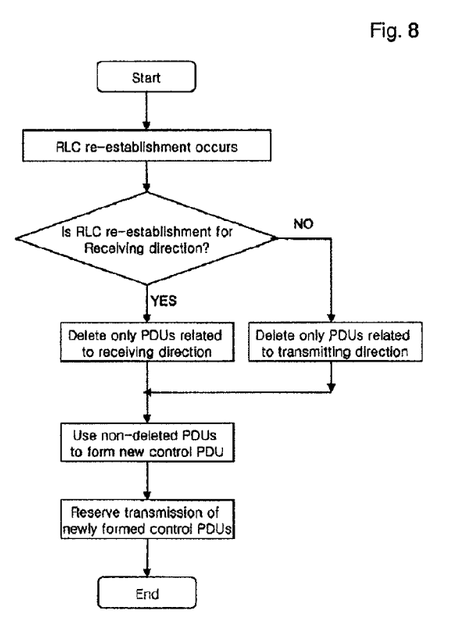
FIG. 8 shows an exemplary flow chart of a RLC re-establishment method in a radio communication system according to the present invention.

FIG. 8 shows an exemplary flow chart of a RLC re-establishment method in a radio communication system according to the present invention.

1. The state variables are initialized and values that can be set are then set.

2. The HFN value of the receiving direction is set according to the value instructed from a higher level.

3. The receiving direction AMD PDUs are deleted.

4. If re-establishment is only in the receiving direction, then among the remaining Control PDUs, the Control PDUs excluding the transmitting direction Control PDUs are deleted.

5. The remaining Control PDUs are formed as new Control PDUs

Here, the most important transmitting side Control PDUs are MRW SUFI and Reset PDU. As the MRW SUFI and Reset PDU are formed as respectively different Control PDUs, an RLC entity operation in the receiving direction re-establishment procedure is also proposed as follows:

1. The state variables are initialized and values that can be set are then set.

2. The HFN value of the receiving direction is set according to the value instructed from a higher level.

3. The receiving direction AMD PDUs are deleted.

4. If re-establishment is only in the receiving direction, then among the remaining Control PDUs, if a MRW SUFI exists, that MRW SUFI is formed as a new Control PDU.

5. Among the remaining Control PDUs, if a Reset PDU exists, the Control PDUs excluding the Reset PDU are deleted.

6. Any newly formed Control PDUs or Reset PDUs are reserved for transmission.

From the viewpoint of MRW SUFI and other Control PDUs, Another embodiment of the present invention is as follows:

1. The state variables are initialized and values that can be set are then set.

2. The HFN value of the receiving direction is set according to the value instructed from a higher level.

3. The receiving direction AMD PDUs are deleted.

4. If re-establishment is only in the receiving direction, the Acknowledgement Status Report, Window SUFI, MRW Ack SUFI, Reset PDU, and Reset Ack PDU are deleted.

5. After the above step, among the remaining Control PDUs, if a MRW SUFI exists, that MRW SUFI is formed as a new Control PDU.

6. New Control PDUs are reserved for transmission.

In the above step 5, the MRW SUFI is merely one example, and regardless of the receiving direction, namely, Control PDUs or SUFI that were formed before re-establishment, not transmitted before re-establishment, and not deleted during re-establishment are all formed as new PDUs in step 5 and transmitted in step 6.

In the above examples, the existence of a Reset PDU means that a Reset procedure is in progress. Thus, in such case, reserving transmission of a Reset PDU means that a new reset procedure is started after the re-establishment procedure. The present invention proposes that for a re-establishment procedure only in the receiving direction, all Control PDUs excluding the MRW SUFI are deleted, and if there was a Reset PDU (i.e., when a Reset procedure was in progress), the Reset procedure is newly started. Here, Control PDUs excluding the MRW SUFI, refers to an Acknowledgement Status Report, Window SUFI, MRW Ack SUFI, and Reset PDU, Reset Ack PDU.

In summary, the receiving direction operation according to the present invention is as follows:

1. The state variables are initialized and values that can be set are then set.

2. The HFN value of the receiving direction is set according to the value instructed from a higher level.

3. The receiving direction AMD PDUs are deleted.

4. If re-establishment is only in the receiving direction, the Acknowledgement Status Report, Window SUFI, MRW Ack SUFI, Reset PDU, and Reset Ack PDU are deleted.

5. After the above steps, if there are any remaining Control PDUs that were formed before re-establishment, not transmitted before the re-establishment procedure, and not deleted in step 4, such Control PDUs are formed as new Control PDUs.

6. The newly formed Control PDU(s) are reserved for transmission.

7. In step 4 above, if there was a Control PDU that was deleted, namely, if there was a Reset procedure in progress before the re-establishment procedure, a Reset PDU is formed and transmitted. Namely, a new Reset procedure is started.

In other words, when a re-establishment procedure occurs (for the transmitting side direction), the transmitting side of the RLC entity does not delete all Control PDUs existing at that time, but only deletes those Control PDUs related to the transmitting side (direction).

Put differently, the present invention proposes that when re-establishment occurs (for the transmitting side direction), the transmitting side of the RLC entity does not delete all existing Control PDUs, but Control PDUs unrelated to the transmitting side (direction) are not deleted. Also, other Control PDUs are all deleted.

Put differently, the present invention proposes that when re-establishment occurs (for the transmitting side direction), the transmitting side of the RLC entity does not delete all existing Control PDUs, but Control PDUs related to the receiving side (direction) are not deleted. Also, the Control PDUs unrelated to the receiving side (direction) are all deleted.

Here, Control PDUs related to the transmitting side (direction) may include MRW SUFI, and the like.

Control PDUs unrelated to the transmitting side (direction) may include Acknowledgement Status Report, Window SUFI, MRW Ack SUFI, Reset PDU, Reset Ack PDU, and the like.

Control PDUs related to the receiving side (direction) may include Acknowledgement Status Report, Window SUFI, MRW Ack SUFI, and the like.

Control PDUs unrelated to the receiving side (direction) may include MRW SUFI, Reset PDU, Reset Ack PDU, and the like.

In one embodiment, the present invention proposes the following operations when the transmitting side (direction) of the RLC is re-established:

1. The state variables are initialized and values that can be set are then set.
2. The HFN value of the transmitting direction is set according to the value instructed from a higher level.
3. For re-establishment only in the transmitting direction, perform procedure from step 4. For re-establishment of both the transmitter and the receiver, perform procedure from step 9.
4. Among the SDUs in the transmitting side, the SDUs that have been completely transmitted are deleted.
5. Among the Control PDUs existing in the RLC entity, if a MRW Ack SUFI exists, that MRW Ack SUFI is formed as a new Control PDU.
6. After step 5, except for the Reset Ack PDU among the remaining Control PDUs, all Control PDUs are deleted. Namely, among the Control PDUs formed before the re-establishment procedure, all Control PDUs (except the Reset Ack PDU) are deleted.
7. The SDUs not deleted as a result of step 4 are re-segmented again according to the set RLC size.
8. Perform procedure from step 10.
9. The Control PDU(s) of both the receiver and transmitter are deleted, and the AMD PDUs in the transmitter are deleted.
10. The timers, excluding Timer_poll_periodic and Timer_status_periodic, are stopped.

As another embodiment, the present invention proposes the following operations when the transmitting side (direction) of the RLC is re-established:

1. The state variables are initialized and values that can be set are then set.
2. The HFN value of the transmitting direction is set according to the value instructed from a higher level.
3. For re-establishment only in the transmitting direction, perform procedure from step 4. For re-establishment of both the transmitter and the receiver, perform procedure from step 9.
4. Among the SDUs in the transmitting side, the SDUs that have been completely transmitted are deleted.
5. Among the Control PDUs existing in the RLC entity, all Control PDUs (excluding the Control PDUs related to the receiving direction) are deleted.
6. After step 5, the remaining other Control PDUs are formed as new Control PDUs and transmission is reserved.
7. The SDUs not deleted as a result of step 4 are re-segmented again according to the set RLC size.
8. Perform procedure from step 10.
9. The Control PDU(s) of both the receiver and transmitter are deleted, and the AMD PDUs in the transmitter are deleted.
10. The timers, excluding Timer_poll_periodic and Timer_status_periodic, are stopped.

In the above examples, the existence of a Reset Ack PDU means that a Reset procedure is in progress. Thus, in such case, reserving transmission of a Reset Ack PDU means that a reset procedure is started after the re-establishment procedure. The present invention proposes that for a re-establishment procedure only in the transmitting direction, all Control PDUs (excluding Control PDUs related to the receiving direction) are deleted, and if there was a Reset Ack PDU (i.e., when a Reset procedure was in progress), the Reset procedure is newly started. Here, Control PDUs excluding those related to the receiving direction, refers to MRW SUFI, and Reset PDU, Reset Ack PDU.

In summary, the transmitting direction operation according to another embodiment of the present invention is as follows:

1. The state variables are initialized and values that can be set are then set.
2. The HFN value of the receiving direction is set according to the value instructed from a higher level.
3. For re-establishment only in the transmitting direction, perform procedure from step 4. For re-establishment of both the transmitter and the receiver, perform procedure from step 10.
4. Among the SDUs in the transmitting side, the SDUs that have been completely transmitted are deleted.
5. Among the Control PDUs existing in the RLC entity, all Control PDUs (excluding those Control PDUs related to the receiving direction) are deleted. Here, the Control PDUs related to the receiving direction are Control PDUs that inform about the receiving side circumstances. For example, an Acknowledgement Status Report that indicates which PDUs were properly received or not received, a Window SUFI that adjusts the window size that can be received, a MRW Ack SUFI that is a response message of the receiving side that is sent for a MRW SUFI that informs about the SDU information discarded at the transmitting side, and the like.
6. After the above steps, if there are any Control PDUs that were formed before the re-establishment procedure, or that were not transmitted before the re-establishment procedure and still remain without being deleted in step 5, such are formed as new Control PDUs.
7. In the above step, transmission of the newly formed Control PDUs is reserved.
8. The SDUs not deleted as a result of step 4 are re-segmented again according to the set RLC size.
9. Perform procedure from step 11.
10. The Control PDU(s) of both the receiver and transmitter are deleted, and the AMD PDUs in the transmitter are deleted.
11. The timers, excluding Timer_poll_periodic and Timer_status_periodic, are stopped.

In the above operation, the procedure of deleting the SDUs that have been completely transmitted among those of the transmitting direction, is only performed when on the transmitting direction is re-established. But when considering the situation where both directions are actually re-established, such re-establishment of both directions can be considered as initializing the RLC entity itself, and thus the occurrence of the above steps may be changed.

Also, in step 8 described above, the re-segmentation of data PDUs is unrelated to the Control PDUs, thus is not affected by sequential order. For example, step 8 can be performed right after step 4.

As described above, the present invention provides a method wherein, if the RLC entity is re-established, all Control PDUs are not deleted regardless of whether re-establishment is only for one direction, but only those Control PDUs related to a particular direction are selectively deleted, and the Control PDUs newly formed after re-establishment are immediately transmitted. As a result, the communication disconnection time is reduced, the RLC data transmission rate is improved, etc. to thus improve user satisfaction.

The present disclosure provides a re-establishment method for an Acknowledged Mode Radio Link Control entity, the method comprising: receiving, from an upper entity, a command to perform Acknowledged Mode Radio Link Control re-establishment; and managing control protocol data units by considering a direction of the Acknowledged Mode Radio Link Control re-establishment. The control protocol data units related to the direction are deleted. The control protocol data units not related to the direction are not deleted. The method may further comprise: scheduling the control PDUs for transmission after acknowledged mode radio link control re-establishment. The upper entity is a Radio Resource Control layer. The Acknowledged Mode Radio Link Control re-establishment is performed in a transmitting direction. The Acknowledged Mode Radio Link Control re-establishment is performed in a receiving direction.

Also, the present disclosure provides a scheme for re-establishment of a radio link control entity, the scheme comprising: deciding to perform re-establishment of a protocol entity; and processing control information by considering the direction of the re-establishment of the protocol entity. The protocol entity is an Acknowledged Mode Radio Link Control entity. The deciding is based upon a command received from an upper layer entity. The control information is in the form of control protocol data units. The Acknowledged Mode Radio Link Control re-establishment is performed in a transmitting direction. The Acknowledged Mode Radio Link Control re-establishment is performed in a receiving direction.

Additionally, the present disclosure provides a protocol stack to support re-establishment of a radio link control entity, the protocol stack comprising: a Radio Resource Control layer adapted to provide instructions to perform re-establishment of a lower layer; and a Radio Link Control layer cooperating with the Radio Resource Control layer and adapted to perform re-establishment based upon the instructions from the Radio Resource Control layer by considering a direction of the re-establishment.

It should be noted that the features of the present invention are related to issues regarding the enhancement and evolution of the 3GPP standard. As such, the 3GPP TS 25.322 and its related sections or portions thereof, as well as various developing enhancements thereof pertain to the present invention. It can be clearly understood that the labeling and terminology used to describe the present invention are merely exemplary and thus may be altered (or later clarified) as a result of ongoing or future discussions.

This specification describes various illustrative embodiments of the present invention. The scope of the claims is intended to cover various modifications and equivalent arrangements of the illustrative embodiments disclosed in the specification. Therefore, the following claims should be accorded the reasonably broadest interpretation to cover modifications, equivalent structures, and features that are consistent with the spirit and scope of the invention disclosed herein.

The invention claimed is:

1. A re-establishment method for an Acknowledged Mode Radio Link Control entity, the method comprising:
performing Acknowledged Mode Radio Link Control (AM RLC) entity re-establishment by a Radio Resource Control (RRC) entity; and
if only a receiving side of the AM RLC entity is re-established, deleting all control protocol data units (PDUs) except for some control protocol data units (PDUs) related to a transmitting side of the AM RLC entity,
wherein the PDUs related to the transmitting side of the AM RLC entity are a move receiving window upper-field (MRW SUFI) and a poll super-field (POLL SUFI); and
if only the transmitting side of the AM RLC entity is re-established, deleting all control protocol data units (PDUs) except for some control protocol data units (PDUs) related to the receiving side of the AM RLC entity,
wherein the PDUs related to the receiving side of the AM RLC entity are an acknowledgement status report, a window SUFI, and a move receiving window acknowledgment super-field (MRW ACK SUFI).

2. The method of claim 1, further comprising:
scheduling the control protocol data units (PDUs) for transmission after acknowledged mode radio link control re-establishment.

3. The method of claim 1, wherein the Acknowledged Mode Radio Link Control re-establishment is performed in a transmitting direction.

4. The method of claim 1, wherein the Acknowledged Mode Radio Link Control re-establishment is performed in a receiving direction.

5. A device having a protocol layer to support re-establishment of a radio link control entity, the protocol layer comprising:
a Radio Resource Control layer adapted to request re-establishment of an Acknowledged Mode Radio Link Control (AM RLC) entity; and
a Radio Link Control layer cooperating with the Radio Resource Control layer and adapted to
perform Acknowledged Mode Radio Link Control (AM RLC) entity re-establishment,
delete all control protocol data units (PDUs) except for some control protocol data units (PDUs) related to a transmitting side of the AM RLC entity if only a receiving side of the AM RLC entity is re-established,
wherein the PDUs related to the transmitting side of the AM RLC entity are a move receiving window upper-field (MRW SUFI) and a poll super-field (POLL SUFI), and
delete all control protocol data units (PDUs) except for some control protocol data units (PDUs) related to the receiving side of the AM RLC entity if only the transmitting side of the AM RLC entity is re-established,
wherein the PDUs related to the receiving side of the AM RLC entity are an acknowledgement status report, a window SUFI, and a move receiving window acknowledgment super-field (MRW ACK SUFI).

* * * * *